Patented Mar. 2, 1937

2,072,259

UNITED STATES PATENT OFFICE 2,072,259

ANTHRAQUINONE DYESTUFFS

Norman Hulton Haddock, Frank Lodge, and Colin Henry Lumsden, Blackley, Manchester, England, assignors to Imperial Chemical Industries Limited, a corporation of Great Britain No Drawing. Application November 11, 1935, Serial No. 49,323. In Great Britain November 14, 1934

3 Claims. (Cl. 260—59)

This invention relates to new anthraquinone dyestuffs.

These dyestuffs are 1:4-diaminoanthraquinone-sulphonic acids which carry in the 2-position an alkylphenoxy, alkoxyphenoxy, alkylthiolphenoxy, alkylphenylthiol, alkoxyphenylthiol, or alkylthiolphenylthiol substituent and in the 3-position either another of the same substituents or an alkylthiol one, and in which in all cases the alkyl substituents contain from 4 to 7 carbon atoms.

The dyestuffs dye wool and other animal fibres from neutral or slightly acid baths preferably with the addition of a dyeing assistant such as cetyl sodium sulphate or Glauber's salt in bright fast violet to green-blue shades. The shades are especially fast to severe washing and to milling. Tests for severe washing and milling are described in British Patent 430,160.

We make the new dyestuffs by replacing one halogen atom in a 2:3-dihalogen-1:4-diaminoanthraquinone with an alkylphenoxy, alkoxyphenoxy, alkylthiolphenoxy, alkylphenylthiol, alkoxyphenylthiol, or alkyylthiolphenylthiol substituent, and also replacing the other halogen atom with one of the same substituents or with ankylthiol substitutent, and then sulphonating. The replacement with the alkylphenoxy, alkoxyphenoxy, alkylthiolphenoxy, alkylphenylthiol, alkoxyphenylthiol, or alkylthiolphenylthiol substituent must be effected by treating with an alkylphenol, alkoxyphenol, alkylthiolphenol, alkylphenyl mercaptan, alkoxyphenyl mercaptan or alkylthiolphenyl mercaptan respectively. The replacement with the alkylthiol substituent must be effected by first treating with an alkali metal sulphide or disulphide and then alkylating. The treatment with the alkali metal sulphide or disulphide is effected either before or after the replacement of the other halogen atom, and the alkylation is effected prior to sulphonation.

The dyestuffs may carry simple substituents for example methyl, chloro or bromo, in either the anthraquinone or the phenyl residues, although valuable dyestuffs are obtained without them.

The treatment with the alkylphenol, alkoxyphenol, alkylthiolphenol, alkylphenyl mercaptan, alkoxyphenyl mercaptan or alkylthiolphenyl mercaptan may be conveniently effected in water pyridine alcohol or excess of the phenol or mercaptan in the presence of caustic alkali. The treatment with the alkali metal sulphide or disulphide is conveniently effected by heating in water. Alkylation may be effected by treatment with alkyl halides. Sulphonation may be effected in concentrated sulphuric acid or oleum.

The following examples in which parts are by weight illustrate but do not limit the invention.

Example 1

200 parts of sodium-2-chloro-1:4-diamino-3-mercaptoanthraquinone (prepared by the process of British Patent No. 387,765, Example 1), 800 parts of alcohol and 90 parts of butyl bromide are stirred at 75° C. for half an hour. The product is filtered cold, washed successively with alcohol and water and dried at 50° C. Violet crystals are obtained.

100 parts of the so-obtained 2-chloro-1:4-diamino-3-butylthiol-anthraquinone-300 parts of 4-p-butylphenol and 30 parts of sodium hydroxide powder are stirred in a closed vessel at 175° C. for 6 hours, cooled to 90° C., the mixture poured into 3380 parts of 3% caustic soda and the suspended violet product filtered, washed well with water and dried at 50° C.

100 parts of the so-obtained base, 1:4-diamino-2 - p-butylphenoxy - 3 - butylmercaptoanthraqui-none are dissolved with stirring in 1000 parts of 100% sulphuric acid at 15–20° C., 150 parts of "oleum" (20% free SO₃) are added and the temperature kept at 20–25° C. for about half an hour until tests show that sulphonation is complete. The mixture is then run into 3500 parts of ice water and the precipitated dyestuff filtered off. It is stirred into 5000 parts of water at 70° C., neutralized with sodium carbonate and precipitated by the addition of sodium chloride.

The new dyestuff is a violet powder readily soluble in water.

2-chloro-1:4-diamino-3-mercaptoanthraqui-none may also be alkylated with isoamyl bromide, instead of butyl bromide, as above and the product reacted with p-isoamylphenol and sulphonated to give a violet dyestuff having very good fastness to severe washing, milling and light.

Example 2

1 part of the dyestuff from Example 1 is dissolved in 3000 parts of water containing 1.5 parts of 15% cetyl sodium sulphate paste. 50 parts of well-wetted woollen yarn are entered, the dyebath raised to the boil in ½ hour and kept at the boil for 1 hour. The dyed yarn is removed, rinsed in cold water and dried. A bright violet shade is obtained, which has good fastness to severe washing, milling and light.

Example 3

10 parts of 2:3-dichloro-1:4-diaminoanthraquinone, 50 parts of p-butylphenol and 8.5 parts of caustic soda are heated at 175° C. for 8 hours (see British Patent No. 26,944/1911). The product is isolated by pouring into 300 parts of water containing 10 parts of caustic soda. It is filtered, washed thoroughly with water and dried. The red-violet product dissolves in sulphuric acid to give brown solutions. It is sulphonated in the following way.

10 parts of product are dissolved in 100 parts of 100% sulphuric acid at 20–25° C. When a test sample in water shows complete solubility the solution is poured into 300 parts of ice water and filtered. The acid paste is stirred into 500 parts of water at 70° C., neutralized with sodium carbonate, filtered, the dyestuff precipitated with salt, filtered cold and dried at 50° C.

The new dyestuff dissolves in sulphuric acid with a brown and in water with a red-violet colour. It dyes wool in bright red-violet shades, which have good fastness to severe washing and very good fastness to milling and light.

Instead of p-butylphenol there may be used p-iso-amylphenol, in which case reddish-violet dyestuffs of even better fastness to severe washing and milling are obtained.

Example 4

112.5 parts of 2-chloro-1:4-diamino-3-isoamylthiol anthraquinone (see Example 1), 500 parts of pyridine, 60 parts of caustic soda liquor 70° Tw. and 70 parts of p-butylphenyl mercaptan (obtained from p-butylaniline by diazotization, coupling with potassium ethyl xanthate and hydrolyzing with caustic soda) are stirred at room temperature for 1 hour. The colour changes from violet to blue. The product is isolated by adding to 2000 parts of ice water and 700 parts of hydrochloric acid, filtered, washed with water and dilute caustic soda and dried at 40° C.

The product, 1:4-diamino-2-p-butylphenylthiol-3-isoamylthiolanthraquinone, is a blue powder soluble in concentrated sulphuric acid with a brown colour and in benzene with a blue colour.

100 parts are dissolved in 800 parts of 100% sulphuric acid at 20° C., 300 parts of "oleum" (25% SO$_3$) are added and the mixture kept at 30° C. with stirring until a test indicates sulphonation is complete. The dyestuff is isolated as in Example 1.

The new dyestuff is a blue powder which dissolves in boiling water with bright blue colour and dyes wool in blue shades of good fastness to severe washing and milling.

In a similar manner 2-chloro-1:4-diamino-3-butylthiolanthraquinone may be reacted with p-isophenyl mercaptan and the product sulphonated. A blue dyestuff having similar properties is obtained.

Example 5

30 parts of 2:3-dichloro-1:4-diaminoanthraquinone, 300 parts of pyridine, 60 parts of caustic soda liquor 70° Tw., and 60 parts of p-butylphenylmercaptan (see Example 4) are stirred at 40° C. for 1 hour. The violet solution quickly changes to greenish-blue and the product separates as a crystalline mass. After diluting with 300 parts of alcohol the product is filtered off, washed with alcohol and water and dried at 100° C.

The so-obtained 1:4-diamino-2:3-bis-p-(butylphenylthiol)-anthraquinone is a slate blue crystalline substance of melting point 168° C.

35 parts of the product are dissolved in 350 parts of 100% sulphuric acid at 20° C., 80 parts of oleum (20% SO$_3$) are added and the mixture stirred at 25° C. until a test sample shows sulphonation is complete. The product is poured into 1500 parts of ice water, filtered, neutralized with sodium carbonate, precipitated with salt, filtered off, washed with weak brine and dried at 100° C.

The new dyestuff is a dark blue powder, soluble with brown colour in concentrated sulphuric acid and with greenish-blue colour in water. It dyes wool in greenish-blue shades of good fastness to severe washing, milling and light.

Instead of p-butylphenylmercaptan, other p-alkylphenylmercaptans such as propyl- or amylphenyl mercaptan may be used and similar dyestuffs obtained.

Example 6

31 parts of 2:3-dichloro-1:4-diaminoanthraquinone, 200 parts of pyridine, 50 parts of caustic soda liquor 70° Tw. and 50 parts of p-isoamyloxyphenylmercaptan (obtained from p-isoamyloxyaniline by diazotization, coupling with potassium ethyl xanthate and hydrolysis with caustic soda) are stirred at 40–50° C. for 15 minutes. The violet colour changes to blue and the condensation product separates as greyish-blue crystals. After cooling and diluting with 300 parts of alcohol, the product is filtered, washed with alcohol and water and dried at 100° C.

The crystalline product dissolves readily in benzene with a bright blue colour and in sulphuric acid with a brown colour. It melts at 154° C.

It is sulphonated by dissolving in 10 parts of 100% sulphuric acid and stirring at 25° C. for 15 minutes, poured into ice water and filtered. The residue is neutralized in warm water with caustic soda liquor and reprecipitated with salt.

The new dyestuff dissolves in water to a blue solution which dyes wool from a neutral bath in blue shades having good fastness to severe washing, milling and light.

Example 7

72 parts of 2-chloro-1:4-diamino-3-butylthiolanthraquinone (see Example 1), 300 parts of pyridine, 60 parts of caustic soda liquor 70° Tw., and 60 parts of p-isoamyloxyphenyl mercaptan (see Example 6) are stirred at 40° C. for 15 minutes. The violet colour of the original mixture quickly changes to blue. 2000 parts of alcohol are added and the product separates on cooling to 20° C. It is filtered, washed with alcohol and water and dried at 50° C.

The so-obtained 1:4-diamino-2-butylthiol-3-p-isoamyloxyphenylthiolanthraquinone is a grey-green crystalline substance of melting point 105° C. It dissolves readily in benzene with a bright blue colour and in concentrated sulphuric acid with a brown colour.

It is sulphonated by treating with 10 parts of 100% sulphuric acid at 20° C. for 15 minutes; and isolated by pouring into water, filtering, washing and drying. The new dyestuff is a dark blue powder, readily soluble in warm water yielding blue solutions which dye wool in blue shades of good fastness to severe washing and milling.

Example 8

The p-butylphenyl mercaptan of Example 5 is replaced by an equal weight of p-butylthiolphenyl mercaptan (obtained from p-aminophenyl-butyl sulphide by diazotizing, coupling with potassium ethyl xanthate and hydrolyzing with caustic soda).

The product is in greyish-green crystals melting at 148° C. and dissolving in benzene with a blue colour.

10 parts are dissolved in 100 parts of 100% $H_2SO_4$ at 25° C. and 100 parts of "oleum" (20% $SO_3$) added. The mixture is heated at 35° C. until sulphonation is complete when the acid solution is poured into 600 parts of ice water and filtered. The product is put into 750 parts of water, neutralized with caustic soda at 80° C., filtered from insoluble matter and precipitated from solution with salt.

The new dyestuff, when dry, is a blue powder soluble in concentrated sulphuric acid with a brown and in water with a blue colour. It dyes wool from a neutral or weak acid bath in blue shades having good fastness to severe washing and milling.

Example 9

30.7 parts of 2:3-dichloro-1:4-diaminoanthraquinone, 100 parts of p-butylphenol and 6 parts of caustic soda are stirred together at 175° C. for 6 hours. The reaction-mixture is poured into 500 parts of water and 300 parts of caustic soda, filtered cold, washed with water, and dried at 40° C.

The so-obtained violet product dissolves in cold xylene with a red-violet colour whereas the starting material 2:3-dichloro-1:4-diaminoanthraquinone is only sparingly soluble.

30 parts of the product, 150 parts of alcohol and 30 parts of a 25% aqueous solution of sodium disulphide are stirred and boiled for 2 hours. The mixture is filtered from any suspended matter, diluted with 400 parts of water and the product precipitated by addition of hydrochloric acid. It is filtered, washed with water, dissolved in 50 parts of pyridine and alkylated by addition of 15 parts of butyl bromide at 95° C. for 1 hour. The product is filtered cold and washed with alcohol and water.

When sulphonated as in Example 1 the same dyestuff is obtained.

We claim:

1. A compound of the group consisting of 1,4-diaminoanthraquinone and its sulfonation products, which carries in the 2-position a group of the class consisting of alkylphenoxy, alkoxyphenoxy, alkylthiolphenoxy, alkylphenylthiol, alkoxyphenylthiol or alkylthiolphenylthiol and which carries in the 3-position a substituent of the class consisting of those mentioned above and alkylthiol, in which the alkyl groups in all cases contain from 4 to 7 carbon atoms.

2. The process for the manufacture of new dyestuffs which comprises replacing one halogen atom in a 2,3-dihalogen-1,4-diaminoanthraquinone with a compound of the group consisting of alkylphenoxy, alkoxyphenoxy, alkylthiolphenoxy, alkylphenylthiol, alkoxyphenylthiol and alkylthiolphenylthiol, and replacing the second halogen atom with a group of the class consisting of the substituents named above and alkylthiol, in which in all cases the alkyl group contains from 4 to 7 carbon atoms.

3. The process for the manufacture of new dyestuffs which comprises replacing one halogen atom in a 2,3-dihalogen-1,4-diaminoanthraquinone with a compound of the group consisting of alkylphenoxy, alkoxyphenoxy, alkylthiolphenoxy, alkylphenylthiol, alkoxyphenylthiol and alkylthiolphenylthiol, and replacing the second halogen atom with a group of the class consisting of the substituents named above and alkylthiol, in which in all cases the alkyl group contains from 4 to 7 carbons atoms, and sulfonating the resulting product.

NORMAN HULTON HADDOCK.
FRANK LODGE.
COLIN HENRY LUMSDEN.